US007899717B2

(12) United States Patent  
Joao

(10) Patent No.: US 7,899,717 B2  
(45) Date of Patent: Mar. 1, 2011

(54) APPARATUS AND METHOD FOR SELLING A TICKET TO AN EVENT AND/OR TO A PORTION OF AN EVENT OR VENUE

(76) Inventor: Raymond Anthony Joao, Yonkers, NY (US)

( * ) Notice: Subject to any disclaimer, the term of this patent is extended or adjusted under 35 U.S.C. 154(b) by 1307 days.

(21) Appl. No.: 09/977,981

(22) Filed: Oct. 15, 2001

(65) Prior Publication Data

US 2002/0128922 A1  Sep. 12, 2002

Related U.S. Application Data

(60) Provisional application No. 60/246,051, filed on Nov. 6, 2000.

(51) Int. Cl.
*G06Q 30/00* (2006.01)
*G06Q 10/00* (2006.01)
(52) U.S. Cl. ...................... 705/26.41; 705/1.1
(58) Field of Classification Search ........... 705/26
See application file for complete search history.

(56) References Cited

U.S. PATENT DOCUMENTS

| | | | |
|---|---|---|---|
| 5,333,257 A * | 7/1994 | Merrill et al. ............... 345/467 |
| 5,621,797 A * | 4/1997 | Rosen ........................... 705/76 |
| 5,754,654 A * | 5/1998 | Hiroya et al. ................ 705/76 |
| 5,930,761 A * | 7/1999 | O'Toole ........................ 705/5 |
| 6,067,532 A * | 5/2000 | Gebb ............................ 705/37 |
| 6,107,932 A * | 8/2000 | Walker et al. ............ 340/5.22 |
| 6,173,209 B1 * | 1/2001 | Laval et al. .................. 700/91 |
| 6,308,159 B1 * | 10/2001 | Strohl ........................... 705/5 |
| 6,496,809 B1 * | 12/2002 | Nakfoor ........................ 705/80 |
| 6,505,774 B1 * | 1/2003 | Fulcher et al. ............. 235/381 |
| 6,658,390 B1 * | 12/2003 | Walker et al. ............... 705/5 |
| 6,999,936 B2 * | 2/2006 | Sehr ............................... 705/5 |
| 7,003,485 B1 * | 2/2006 | Young ......................... 705/37 |
| 7,031,945 B1 * | 4/2006 | Donner ....................... 705/64 |
| 7,044,362 B2 * | 5/2006 | Yu ............................. 235/375 |
| 7,110,552 B1 * | 9/2006 | Saliterman ................. 381/77 |
| 7,162,454 B1 * | 1/2007 | Donner et al. ............. 705/64 |
| 7,203,665 B2 * | 4/2007 | Donner ....................... 705/64 |
| 7,454,361 B1 * | 11/2008 | Halavais et al. ............. 705/5 |
| 7,529,681 B2 * | 5/2009 | Barnes et al. ................ 705/1 |
| 7,536,307 B2 * | 5/2009 | Barnes et al. ................ 705/1 |
| 7,540,415 B2 * | 6/2009 | Frank et al. ............... 235/382 |
| 7,548,866 B2 * | 6/2009 | Halavais et al. ............. 705/5 |
| 7,548,867 B2 * | 6/2009 | Halavais et al. ............. 705/5 |
| 7,548,868 B2 * | 6/2009 | Halavais et al. ............. 705/5 |
| 7,548,869 B2 * | 6/2009 | Halavais et al. ............. 705/5 |
| 7,548,870 B2 * | 6/2009 | Halavais et al. ............. 705/5 |
| 2002/0040482 A1 * | 4/2002 | Sextro et al. .............. 725/136 |

OTHER PUBLICATIONS

Anonymous, "Extra tickets to Disney are often resold," Dec. 22, 1991, pp. 2.*

* cited by examiner

*Primary Examiner* — Asfand Sheikh
(74) *Attorney, Agent, or Firm* — Raymond A. Joao, Esq.

(57) ABSTRACT

A computer-implemented method, including receiving and storing, with a central processing computer, information regarding an available ticket for a portion of an event prior to a start, completion, or conclusion, of the event or when an individual is leaving a venue of the event or leaving during the event, wherein the individual or another individual initiates or establishes a communication link with the central processing computer using a first communication device, processing information regarding a ticket request or a ticket option request using the information regarding an available ticket, generating a ticket availability message or ticket option availability message, and transmitting the ticket availability message or ticket option availability message to a second communication device associated with a second individual before a completion or a conclusion of the event.

39 Claims, 5 Drawing Sheets

APPARATUS AND METHOD FOR SELLING A TICKET TO AN EVENT AND/OR TO A PORTION OF AN EVENT OR VENUE

RELATED APPLICATIONS

This application claims the benefit of priority of U.S. Provisional Patent Application Ser. No. 60/246,051, filed Nov. 6, 2000, and entitled "APPARATUS AND METHOD FOR SELLING A TICKET TO AN EVENT AND/OR TO A PORTION OF AN EVENT OR VENUE", the subject matter of which is hereby incorporated by reference herein.

FIELD OF THE INVENTION

The present invention pertains to an apparatus and method for selling a ticket to an event or venue and/or to a portion of an event or venue and, in particular, the present invention pertains to an apparatus and method for selling or reselling a ticket to an event or venue and/or to a portion of an event or venue which can facilitate a sale or resale of a ticket for an event or venue or for a portion of an event or venue.

BACKGROUND OF THE INVENTION

Sporting events, theatrical events, entertainment events, and/or any other events, to which tickets for admission are sold or otherwise exchanged in commerce or otherwise, are enjoyed by millions of individuals each year. It is commonly known that tickets to the above-described events or venues are or can be expensive. In many instances, individuals purchase tickets and either do not utilize them or only utilize them for a portion of the respective event of venue. In these instances, the seats or venue for which the tickets correspond go unutilized by the ticket holder for the entire event or portion of the event, whichever the case may be.

An example of the above is when a season ticket holder of baseball tickets, basketball tickets, football tickets, or hockey tickets, fails to utilize his or her tickets for every game, and/or when the holder of a ticket(s) leaves a game prior to its completion or conclusion. Similarly, season ticket holders for theatre tickets, movie tickets, etc., can experience the same non-use of their respective tickets.

Unfortunately, once tickets are sold by a ticket office, ticket issuer, event sponsor, or other ticket seller or ticket dispenser, the ticket holder must either utilize the ticket(s), resell the ticket(s) prior to the start or beginning of the event, utilize the ticket(s) for only a portion of the event, or let the ticket(s) go used completely.

The value of tickets which go completely unused or which go only partially used can be very great and can represent a substantial amount of lost or foregone revenues for ticket holders who are unable to utilize tickets and/or who only utilize tickets for a portion of an event or for a portion of a venue.

There appears to be no apparatus or method in the prior art which can allow a ticket holder to recoup revenues for unused tickets and/or tickets which are only utilized for a portion of an event or for a portion of a venue.

SUMMARY OF THE INVENTION

The present invention pertains to an apparatus and method for selling a ticket or tickets to an event or venue and/or to a portion of an event or venue which overcomes the shortfalls of the prior art. The present invention also pertains to an apparatus and method for selling a ticket option to an event or venue and/or to a portion of an event or venue.

The present invention also provides an apparatus and method which can facilitate a resale of a ticket for an event or venue or for a portion of an event or venue. The present invention can also provide an apparatus and method which can facilitate the resale of a used ticket or tickets.

The present invention can also provide and apparatus and method which can provide notification of the availability of a ticket(s) for sale or resale. The present invention can also provide and apparatus and method which can provide notification of the availability of a buyer for a ticket(s) for an event or venue or for a portion of an event or venue.

The present invention can also provide information for selling and/or trading options to purchase or to sell any of the tickets described herein.

The apparatus can include a central processing computer or server computer for processing ticket information and/or ticket transaction information, any number of user computers or user communication devices via which the user or individual can communicate with the central processing computer, and any number of ticket issuer computers or ticket issuer communication devices via which a ticket issuer can communicate with the central processing computer.

Any number of central processing computers, user communication devices, and/or the ticket issuer communication devices, can be utilized in conjunction with the present invention.

The central processing computers, the user communication devices, and/or the ticket issuer communication devices, can communicate with any other central processing computers, user communication devices, and/or ticket issuer communication devices, over any suitable communication network or system, including, but not limited to the Internet, the World Wide Web, a telephone network, a telecommunication network, a digital communication network, a satellite communication network, a wireless communication network, a personal communication services network, a broadband communication network, a bluetooth communication network, and/or any other communication network and/or system.

The apparatus and method of the present invention can be utilized for selling and/or reselling a ticket(s) to an event or venue and/or to a portion of an event or venue. The present invention can also provide a clearinghouse for previously purchased tickets and/or tickets which have been utilized for only a portion of an event.

The apparatus and/or the central processing computer can process a user's or an individual's request for a ticket or tickets and identify any ticket or tickets which may satisfy the user's or the individual's request.

The apparatus and/or the central processing computer can also generate a ticket availability report or message which can contain information regarding any available ticket or tickets along with any information regarding same and/or corresponding to same. The apparatus and/or the central processing computer can also generate a notification message for the ticket holder in order to notify him or her of the sale or resale of the ticket or tickets.

The apparatus and/or the central processing computer can process any request to purchase any ticket or tickets and/or consummate any transactions involving any ticket or tickets described herein. The apparatus and/or the central processing computer can also effectuate payment to a ticket holder, payment from a user or an individual, and/or payment to any third party facilitators or ticket issuers.

The apparatus and/or the central processing computer can also provide a ticket and/or ticket information in hard copy form or in electronic form.

The present invention can be utilized in order to purchase a ticket or tickets for an event and/or in order to upgrade a ticket or tickets during an event and/or prior to the conclusion or completion of the event.

The present invention can also be utilized in order to sell or resell options for tickets for any of the events or venues described herein. The present invention can also be utilized in order to price and/or define any terms of any options for any ticket or tickets.

The apparatus and method of the present invention can also be utilized in order to provide notification of the availability of a ticket or tickets for sale or resale. The apparatus and/or the central processing computer can process a respective request for a ticket(s) in conjunction with available ticket(s). The apparatus and/or the central processing computer can also process a respective request for a ticket option(s) in conjunction with available ticket option(s).

The apparatus and/or the central processing computer can also generate a ticket availability notification message which can include information regarding an available ticket or tickets. The apparatus and/or the central processing computer can also transmit the ticket availability notification message to an individual or a user desirous of obtaining ticket(s) or ticket option(s). The apparatus and/or the central processing computer can also generate a ticket buyer availability message and transmit same to a ticket holder.

The apparatus and method of the present invention can also provide notification of the availability of a buyer for a ticket or tickets. The apparatus and/or the central processing computer can process information regarding a request for a ticket or tickets in conjunction with information regarding a ticket or tickets which are or which can be available for sale or resale. The apparatus and/or the central processing computer can also generate a ticket buyer availability notification message and transmit same to a ticket holder.

The apparatus and/or the central processing computer can also generate a ticket availability message and transmit same to user or individual interested in purchasing a ticket or tickets. The apparatus and/or the central processing computer can also provide a ticket holder with contact information for the user or individual.

The apparatus and/or the central processing computer can also monitor, record, and/or store, data and/or information regarding any and/or all of the transactions, sales, re-sales, and/or purchases, for any ticket(s) and/or ticket option(s) which can be facilitated and/or effected via the present invention.

The apparatus and/or the central processing computer can also administer and/or maintain a financial account(s) for, or on behalf of, any of the users, individuals, ticket holders, ticket issuers, and/or any other party or entity who or which utilizes the present invention.

The apparatus and method of the present invention can also be utilized to provide for the bidding for, and/or the auctioning off of, any of the herein-described tickets and/or ticket options.

The present invention can also be utilized in conjunction with intelligent agents, software agents, mobile agents, and/or related technologies. The apparatus of the present invention can also be programmed to be self-activating and/or activated automatically. The apparatus of the present invention can also be programmed in order to automatically generate and/or transmit e-mail messages, electronic message transmissions, electronic notification transmissions, electronic catalogs, electronic coupons, between any of the users, individuals, entities, and/or parties, which utilize the present invention.

The present invention can also utilize electronic commerce technologies and security methods, techniques and technologies.

Accordingly, it is an object of the present invention to provide an apparatus and method for selling a ticket or tickets to an event or venue.

It is another object of the present invention to to provide an apparatus and method for selling a ticket or tickets to a portion of an event or venue.

It is still another object of the present invention to provide an apparatus and method for selling a ticket option to an event or venue and/or to a portion of an event or venue.

It is yet another object of the present invention to provide an apparatus and method for selling a ticket or tickets to an event or venue which can facilitate a resale of a ticket for an event or venue or for a portion of an event or venue.

It is another object of the present invention to provide an apparatus and method for selling a ticket or tickets to an event or venue which can facilitate a resale of a used ticket or tickets.

It is still another object of the present invention to provide an apparatus and method for selling a ticket or tickets to an event or venue which can provide notification of the availability of a ticket(s) for sale or resale.

It is yet another object of the present invention to provide an apparatus and method for selling a ticket or tickets to an event or venue which can provide notification of the availability of a buyer for a ticket(s) for an event or venue or for a portion of an event or venue.

It is another object of the present invention to provide an apparatus and method for selling a ticket or tickets to an event or venue which provide information for selling and/or trading options to purchase or to sell a ticket or tickets.

It is still another object of the present invention to provide an apparatus and method for selling a ticket or tickets to an event or venue which can operate on, over, and/or in conjunction with, any communication network or system.

It is yet another object of the present invention to provide an apparatus and method for selling a ticket or tickets to an event or venue which can operate on, over, and/or in conjunction with, a wireless communication network or system.

It is another object of the present invention to provide an apparatus and method for selling a ticket or tickets to an event or venue which can operate on, over, and/or in conjunction with the Internet and/or the World Wide Web.

It is still another object of the present invention to provide an apparatus and method for selling a ticket or tickets to an event or venue which can operate on, over, and/or in conjunction with wireless Internet and/or the wireless World Wide Web network or system.

It is yet another object of the present invention to provide an apparatus and method for selling a ticket or tickets to an event or venue which can provide a clearinghouse for previously purchased tickets and/or tickets which have been utilized for only a portion of an event.

It is another object of the present invention to provide an apparatus and method for selling a ticket or tickets to an event or venue which can process an individual's request for a ticket or tickets and identify any ticket or tickets which may satisfy the request.

It is still another object of the present invention to provide an apparatus and method for selling a ticket or tickets to an event or venue which can generate a ticket availability report or message containing information regarding an available ticket or tickets.

It is yet another object of the present invention to provide an apparatus and method for selling a ticket or tickets to an event or venue which can generate a notification message to provide notification to a ticket holder of a sale or resale of a ticket or tickets.

It is another object of the present invention to provide an apparatus and method for selling a ticket or tickets to an event or venue which can provide notification of the availability of a ticket or tickets for sale or resale.

It is still another object of the present invention to provide an apparatus and method for selling a ticket or tickets to an event or venue which can process a request for a ticket(s) in conjunction with available ticket(s).

It is yet another object of the present invention to provide an apparatus and method for selling a ticket or tickets to an event or venue which can process a request for a ticket option(s) in conjunction with available ticket option(s).

It is another object of the present invention to provide an apparatus and method for selling a ticket or tickets to an event or venue which can generate a ticket availability notification message which can contain information regarding an available ticket or tickets.

It is still another object of the present invention to provide an apparatus and method for selling a ticket or tickets to an event or venue which can transmit a ticket availability notification message to an individual desirous of obtaining a ticket(s) or a ticket option(s).

It is yet another object of the present invention to provide an apparatus and method for selling a ticket or tickets to an event or venue which can generate a ticket buyer availability message and/or transmit same to a ticket holder.

It is another object of the present invention to provide an apparatus and method for selling a ticket or tickets to an event or venue which can provide notification of the availability of a buyer for a ticket or tickets.

It is still another object of the present invention to provide an apparatus and method for selling a ticket or tickets to an event or venue which can process any request to purchase a ticket or tickets.

It is yet another object of the present invention to provide an apparatus and method for selling a ticket or tickets to an event or venue which can consummate a transaction involving a ticket or tickets.

It is another object of the present invention to provide an apparatus and method for selling a ticket or tickets to an event or venue which can effectuate payment to a ticket holder, payment from an individual, and/or payment to a third party facilitator or a ticket issuer.

It is still another object of the present invention to provide an apparatus and method for selling a ticket or tickets to an event or venue which can provide a ticket and/or ticket information in hard copy form.

It is yet another object of the present invention to provide an apparatus and method for selling a ticket or tickets to an event or venue which can provide a ticket and/or ticket information in electronic form.

It is another object of the present invention to provide an apparatus and method for selling a ticket or tickets to an event or venue which can be utilized in order to purchase a ticket or tickets for an event and/or in order to upgrade a ticket or tickets during an event.

It is still another object of the present invention to provide an apparatus and method for selling a ticket or tickets to an event or venue which can be utilized in order to price and/or define terms of a ticket option.

It is yet another object of the present invention to provide an apparatus and method for selling a ticket or tickets to an event or venue which can monitor, record, and/or store, data and/or information regarding transactions, sales, re-sales, and/or purchases, of tickets and/or ticket options.

It is another object of the present invention to provide an apparatus and method for selling a ticket or tickets to an event or venue which can administer and/or maintain a financial account(s) for, or on behalf of, any of the users, individuals, ticket holders, ticket issuers, and/or any other party or entity who or which utilizes the present invention.

It is still another object of the present invention to provide an apparatus and method for selling a ticket or tickets to an event or venue which can be utilized to provide for the bidding for, and/or the auctioning off of, any of the herein-described tickets and/or ticket options.

It is yet another object of the present invention to provide an apparatus and method for selling a ticket or tickets to an event or venue which can be utilized in conjunction with intelligent agents, software agents, mobile agents, and/or related technologies.

It is another object of the present invention to provide an apparatus and method for selling a ticket or tickets to an event or venue which can be programmed to be self-activating and/or activated automatically.

It is still another object of the present invention to provide an apparatus and method for selling a ticket or tickets to an event or venue which can be programmed in order to automatically generate and/or transmit e-mail messages, electronic message transmissions, electronic notification transmissions, electronic catalogs, electronic coupons, between any of the users, individuals, entities, and/or parties, which utilize the present invention.

It is yet another object of the present invention to provide an apparatus and method for selling a ticket or tickets to an event or venue which can utilize electronic commerce technologies and security methods, techniques and technologies.

Other objects and advantages of the present invention will be apparent to those skilled in the art upon a review of the Description of the Preferred Embodiment taken in conjunction with the Drawings which follow.

DESCRIPTION OF THE PREFERRED EMBODIMENTS

Figure 1:
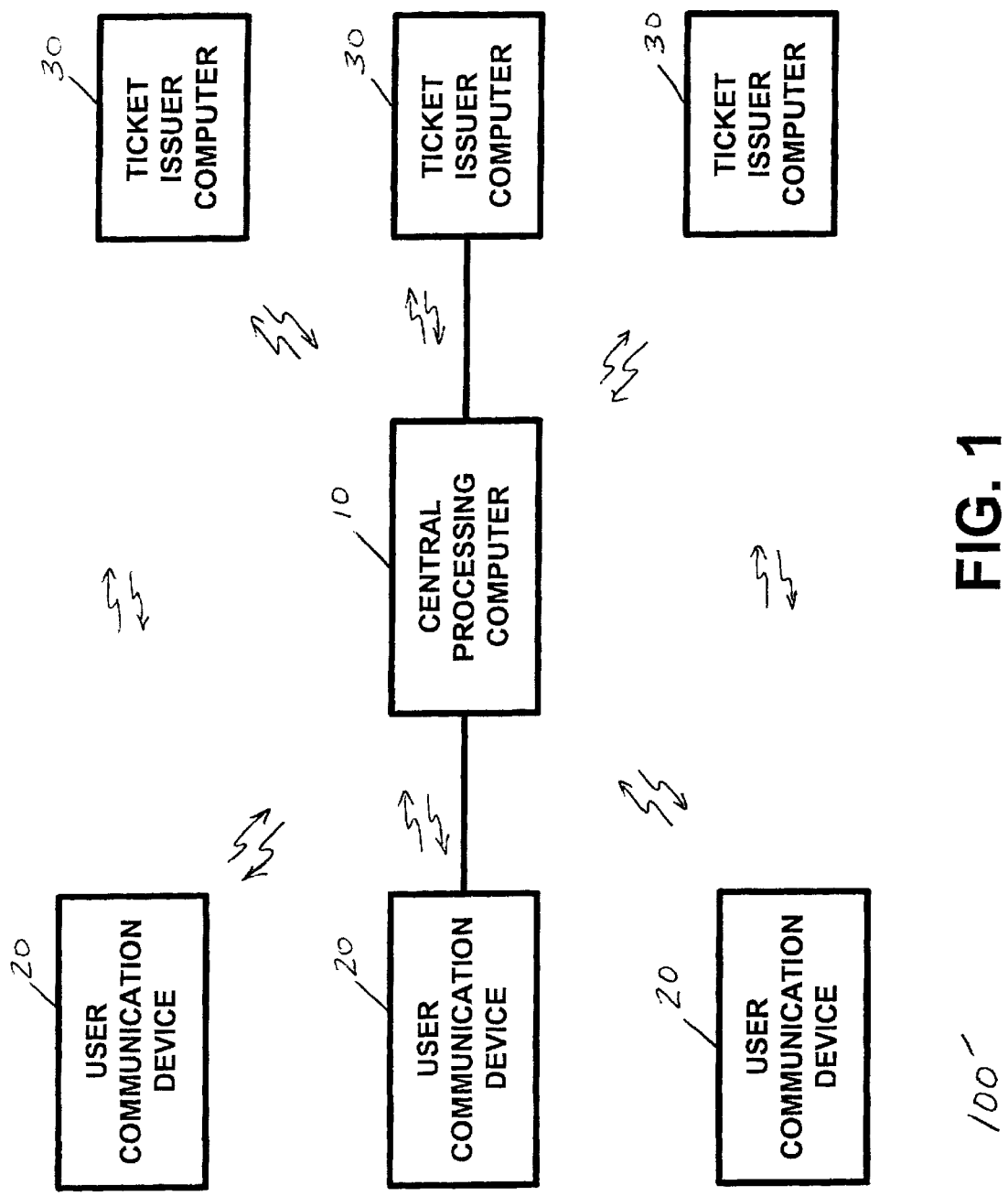
FIG. 1 illustrates the apparatus of the present invention, in block diagram form.

The present invention pertains to an apparatus and method for selling a ticket to an event or venue and/or to a portion of an event or venue.

The present invention provides an apparatus and method for selling a ticket to an event or venue and/or to a portion of an event or venue which can facilitate a resale of a ticket for an event or venue or for a portion of an event or venue. The present invention can also provide information for or regarding selling and/or trading options to purchase or to sell any of the tickets described herein.

The present invention can also provide and apparatus and method which can provide notification of the availability of a ticket(s) for sale or resale. The present invention can also provide and apparatus and method which can provide notification of the availability of a buyer for a ticket(s) for an event or venue or for a portion of an event or venue.

As defined herein, the term "ticket" or "tickets" refer to any tickets, conventional tickets, physical tickets, electronic tickets, digital tickets, licenses, invitations, and/or any other mode or means, for allowing and/or permitting entry into, attendance at or in, and/or any other presence at or in, an event or venue, a sporting event or venue, a theatrical event or venue, a movie event or venue, an entertainment event or venue, a concert event or venue, and/or any other event or venue for which tickets may be sold or otherwise offered.

As defined herein, the terms "event" or "events" refer to any event, sporting event(s), baseball game(s), basketball game(s), football game(s), hockey game(s), tennis event(s), swimming event(s), skiing event(s), athletic event(s), athletic competition event(s), Olympic event(s), and/or any game(s), event(s), tournament, and/or competition(s), theatrical event or performance, movie event or performance, entertainment event or performance, concert event or performance, and/or any other event or performance for tickets may be sold or otherwise offered.

As defined herein, the term "venue" or "venue" refer to any stadium(s), arena(s), theatre(s), movie theatre(s), concert hall(s), museum(s), performance hall(s), indoor stadium(s), indoor arena(s), indoor theatre(s), indoor movie theatre(s), indoor concert hall(s), indoor museum(s), indoor performance hall(s), outdoor stadium(s), outdoor arena(s), outdoor theatre(s), outdoor movie theatre(s), outdoor concert hall(s), outdoor museum(s), outdoor performance hall(s), and/or any other place(s) or location(s) where any of the herein-described and/or herein-defined events can be held, take place, and/or occur.

As defined herein, the terms "user", "individual", or the plurals of same, refer to any user, users, individual, individuals, ticket owner, ticket owners, ticket holder, ticket holders, ticket seller, ticket sellers, ticket buyer, ticket buyers, ticket broker, ticket brokers, ticket issuer, ticket issuers, and/or any other individuals or entities who or which utilize the apparatus and method of the present invention.

As used herein, the terms "ticket issuer", "ticket broker", "ticket agent", "event producer", "event sponsor", "organization", or the plurals of same refer to any ticket issuer(s), ticket issuing organization(s), ticket broker(s), ticket agent(s), event organizer(s), event producer(s), event sponsor(s), and/or any other organization(s) responsible for holding, offering, and/or providing any of the herein-described events and/or venues.

Applicant hereby incorporates by reference herein the subject matter and teachings of U.S. Provisional Patent Application Ser. No. 60/246,051, filed Nov. 6, 2000, which teaches and discloses an apparatus and method for selling a ticket to an event and/or to a portion of an event or venue.

FIG. 1 illustrates the apparatus of the present invention, in block diagram form. The apparatus of FIG. 1 is designated generally by the reference numeral 100. With reference to FIG. 1, the apparatus 100 includes a central processing computer or server computer 10 for processing ticket information and/or ticket transaction information, any number of user computers or communication devices 20 (hereinafter "user communication device 20") via which the user or individual can communicate with the central processing computer 10, and any number of ticket issuer computers or ticket issuer communication devices (hereinafter "ticket issuer communication device 30") via which a ticket issuer can communicate with the central processing computer 10.

Each of the central processing computers 10, the user communication devices 20, and/or the ticket issuer communication devices 30, can include a central processing unit (CPU), a random access memory (RAM), a read only memory (ROM), an input device, a display device, a receiver, a transmitter, a database, and an output device.

The database(s) of the central processing computer(s) 10 can include any and/or all of the data and/or information needed and/or desired for performing all of the processing routines and/or functionality described herein as being provided by the apparatus 100.

The database of the central processing computer 10 can contain data and/or information regarding events, sporting events, games, tournaments, performances, theatrical performances, movie performances, concerts, and/or any other events described herein, schedules of the respective events, dates of the respective events, and/or times of the respective events. The database of the central processing computer 10 can also contain data and/or information regarding delays, cancellations, and/or rescheduling, of any of the herein-described events.

The database of the central processing computer 10 can also contain data and/or information regarding the players, athletes, actors, performers, and/or other participants, in any of the herein-described events. The database of the central processing computer 10 can also contain data and/or information regarding the location and/or venue of any of the herein-described events as well as directions to the respective venues.

The database of the central processing computer can also include information regarding the tickets to the events or venues which can include, but which is not limited to, the location of the seat or seats for which the ticket or tickets correspond, the price or prices of the respective tickets, information regarding whether the ticket of tickets are owned or held by season ticket holders, ticket holders of a ticket plan or package, and/or regular ticket holders, the usage habits of the holders of the respective ticket or tickets, information regarding a non-use or planned non-use of a ticket or tickets by a ticket holder, information regarding a probability of a non-use of a ticket or tickets by a respective ticket holder, resale prices charged by respective ticket holders, including premiums charges above face value, face value, and/or discounts off of face value.

The database of the central processing computer 10 can also contain data and/or information regarding contact information for or regarding any of the ticket issuers described herein. The database of the central processing computer 10 can also contain data and/or information regarding contact information for or regarding any of the ticket holders or ticket owners described herein.

The database of the central processing computer 10 can also contain data and/or information regarding the prices of the various tickets described herein, face value of the various tickets, location of the seats corresponding to the various tickets, a video clip or video picture of the view from the respective tickets, availability of tickets for resale, resale price or prices of the tickets, options to buy any of the tickets described herein, prices for any of the options to buy any of the tickets described herein. The database of the central processing computer 10 can also contain data and/or information for determining option prices for any of the options for any of the tickets described herein.

The database of the central processing computer 10 can also contain data and/or information regarding a prorated price or prices and/or price reductions for any of the herein-described tickets during the course of an event or use of a venue, and/or for any remaining portion of an event or venue. The database of the central processing computer 10 can also contain data and/or information regarding price reductions for tickets sold or resold during an event.

The database of the central processing computer 10 can also contain data and/or information regarding a ticket holders propensities to leave an event or venue early and/or prior to event completion of conclusion. The database of the central processing computer 10 can also contain data and/or information regarding the past prices charged by ticket holders for partially used tickets.

The database of the central processing computer 10 can also contain data and/or information regarding ticket issuers, ticket agents, ticket brokers, and/or any other provider of tickets for any herein-described events. The database of the central processing computer 10 can also contain contact information for or regarding any of the respective ticket issuers, ticket agents, ticket brokers, and/or any other provider of tickets.

The database of the central processing computer 10 can also contain data and/or information regarding contact information regarding any of the herein-described users, individuals, ticket issuers, and/or any other individuals or entities, who or which utilize the present invention. The contact information can include name, address, telephone number, facsimile number, e-mail address, beeper number, pager number, cellular telephone number, wireless communication device number, and/or any instant messaging contact information.

The database of the central processing computer 10 can also contain data and/or information regarding ticket preferences and/or ticket orders by or from any of the users or individuals who or which desire to purchase tickets and/or tickets for remaining portions of events. The database of the central processing computer 10 can also contain data and/or information regarding ticket availability and/or tickets being offered for sale by or from any of the users or individuals who or which desire to sell or resell tickets and/or tickets for remaining portions of events.

The database of the central processing computer 10 can also contain data and/or information regarding prices of costs for purchasing, selling and/or for reselling, any of the herein-described tickets. The price or cost information can also include prices for the tickets, premium prices above face value, face values prices, discounts prices below face value, brokerage charges or fees, agent charges or fees, commission charges or fees, intermediary charges or fees, shipping charges or fees, handling charges or fees, and/or any other charges and/or fees which can be applied and/or incurred in purchasing and/or selling any of the herein-described tickets.

The database of the central processing computer 10 can also include data and/or information regarding trading, bartering and/or swapping of any of the herein-described tickets.

The database of the central processing computer 10 can also contain data and/or information regarding posted or asking prices by sellers or resellers of any of the herein-described tickets, offering prices by prospective buyers of any of the herein-described tickets.

The database of the central processing computer 10 can also contain data and/or information regarding ticket orders and/or preferences by or of any of the prospective ticket purchasers and/or purchasers for any tickets for any remaining portions of any of the events described herein.

The database of the central processing computer 10 can also contain any data and/or information regarding financial accounts of any of the users, individuals, ticket issuers, and/or any other individual and/or entities, who or which utilize the apparatus and method of the present invention. The database of the central processing computer 10 can also contain any data and/or information for performing and/or for effecting financial transactions by and/or between any of the users, individuals, ticket issuers, and/or any other individual and/or entities, who or which utilize the apparatus and method of the present invention. The database of the central processing computer 10 can also contain data and/or information for performing electronic funds transfers, monetary transfers, and/or monetary value transfers.

The database of the central processing computer 10 can also contain data and/or information for conducting auctions and/or bidding for or involving any of the tickets described herein.

The database of the central processing computer 10 can also contain data and/or information for processing electronic signatures, digital signatures, digital representations of handwritten signatures, and/or any other electronic identification information. Applicant hereby incorporates by reference herein the subject matter and teachings of *Applied Cryptography*, Second Edition, Bruce Schneier, Wiley, 1996.

The database of the central processing computer 10 can also contain any programs, software programs, and/or algorithms, for performing any of the processing routines and/or functionality described herein as being performed by the central processing computer 10, the apparatus 100, and/or any of the user communication devices 20 and/or ticket issuer communication devices 30, described herein.

The respective database(s) of the user communication device(s) 20, and/or the ticket issuer communication device(s), can also include any of the data and/or information which is stored in the database of the central processing computer(s) 10 any/or any other data and/or information needed and/or desired for performing any of the respective processing routines and/or functionality of the respective computers or communication devices.

Any number of central processing computers 10, the user communication devices 20, and/or the ticket issuer communication devices 30, can be utilized in conjunction with the present invention.

The central processing computers 10, the user communication devices 20, and/or the ticket issuer communication devices 30, can communicate with any other central processing computers 10, user communication devices 20, and/or ticket issuer communication devices 30, over any suitable communication network or system, including, but not limited to the Internet, the World Wide Web, a telephone network, a telecommunication network, a digital communication network, a satellite communication network, a wireless communication network, a personal communication services network, a broadband communication network, a bluetooth communication network, and/or any other communication network and/or system.

Any of the central processing computers 10, the user communication devices 20, and/or the ticket issuer communication devices 30, can be any computer, computer system, group of computers, telephones, personal computers, wireless telephones, personal digital assistants, video telephones, personal communication devices, wireless devices, handheld devices, palm-top devices, and/or any other communication device(s) and/or computer(s). Any of the user communication devices 20, the ticket issuer communication devices 30, and/or any of the central processing computers 10, can also be computers or communication devices which are located at public locations such as at public kiosks, automated teller machine (ATM), public computer terminals, and/or at any other locations which are located at any suitable location.

Any of the publicly accessible user communication devices 20, ticket issuer computers 30, and/or any of the central processing computers 10, can be located at any of the herein-described and/or herein-defined venues, stadiums, arenas, theatres, movie theatres, concert halls, museums, performance halls, indoor stadiums, indoor arenas, indoor theatres, indoor movie theatres, indoor concert halls, indoor museums, indoor performance halls, outdoor stadiums, outdoor arenas, outdoor theatres, outdoor movie theatres, outdoor concert halls, outdoor museums, outdoor performance halls, public buildings, parks, private buildings, and/or any other location which is or can be accessible to any of the herein-described users of the present invention.

Figure 2A:
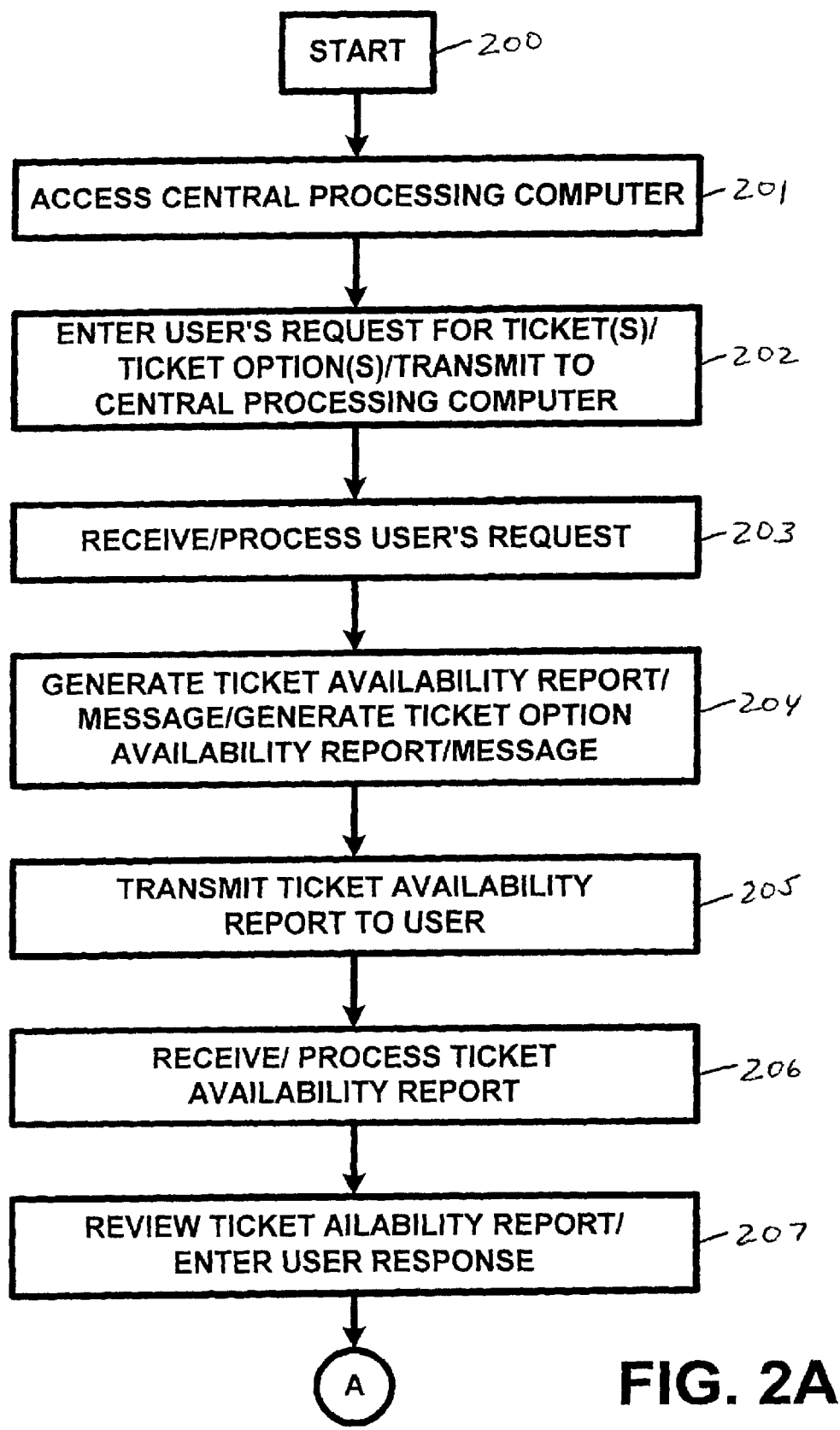
FIGS. 2A and 2B illustrate a preferred embodiment method for utilizing the apparatus of FIG. 1, in flow diagram form.
Figure 2B:
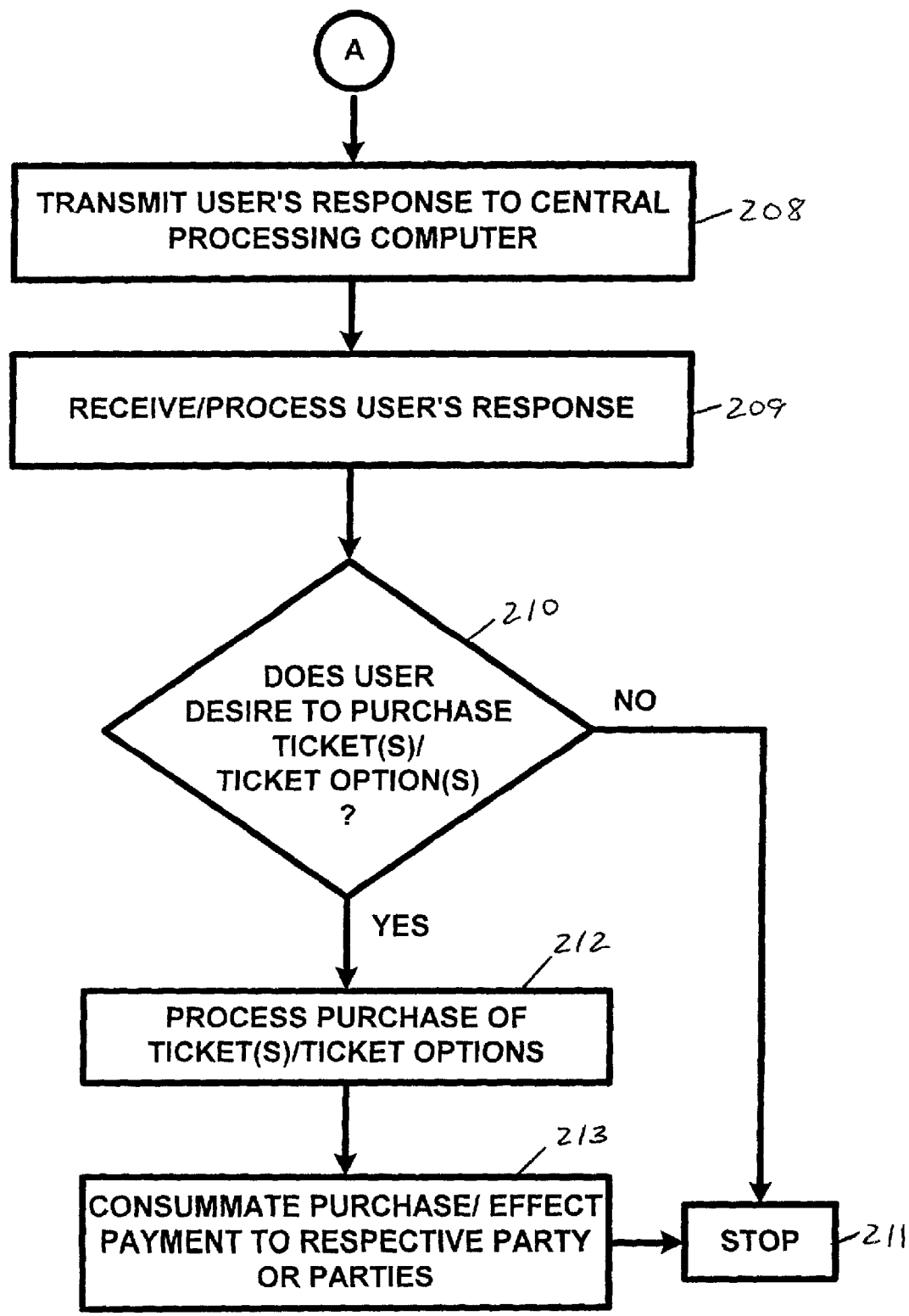

In a preferred embodiment, the apparatus and method of the present invention can be utilized for selling and/or reselling a ticket(s) to an event or venue and/or to a portion of an event or venue. FIGS. 2A and 2B illustrate a preferred embodiment method for utilizing the apparatus 100, in flow diagram from.

In the embodiment of FIGS. 2A and 2B, the apparatus 100 can be utilized to sell or resell a ticket or tickets to an event or venue and/or to sell or resell a ticket to a portion or remaining portion of an event or venue. For example, in a case involving a season ticket holder or holder of a ticket package for sporting events, baseball games, football games, etc., the holder can sell or resell a ticket or tickets to any of the events or venues for which he or she holds a ticket or tickets. This can occur, for example, when a holder of a ticket or tickets will not be utilizing the ticket of tickets and desires to sell or resell the respective ticket or tickets in order to recoup the purchase price or a portion thereof for the ticket or tickets.

The apparatus 100 of FIGS. 2A and 2B can also be utilized in order sell or resell a ticket or tickets for a portion or for a remaining portion of an event or venue. For example, a holder of a ticket or tickets to a sporting event, a baseball game, a football game, etc., upon deciding to leave an event or game early or prior to the completion or conclusion of the event or game can sell or resell the ticket or tickets for his or her seat or seats and/or can sell the right to use the seat or seats corresponding to the ticket or tickets to another or to others in order to recoup a portion price of the respective ticket or tickets. In this manner, the apparatus 100 of Figure can provide a clearinghouse for previously purchased tickets and/or tickets which have been utilized for only a portion of an event.

At any time prior to the start of an event and/or at any time during the event, a ticket holder or ticket owner can access the central processing computer 10 via any of the user communication devices 20 described herein. The ticket holder for example can access the central processing computer can, for example, a personal computer, a cellular or wireless communication device, and/or a communication device located at a publicly located kiosk. A ticket holder can access the central processing computer 10 prior to an event or game. A ticket holder can also access the central processing computer 10 during an event or game.

The ticket holder can post or provide information regarding the ticket or tickets which he or she desires to sell or resell, the price which he or she is willing to sell or resell the ticket or tickets for, as well as any other information related to the tickets or tickets and/or related to any terms or conditions regarding their sale, resale, and/or delivery.

In the case of an individual leaving an event or game early, prior to its conclusion, and/or prior to its completion, the ticket holder can access the central processing computer 10 while at the event or game, either from a mobile or wireless user communication device and/or from a communication device located in a kiosk, or ATM machine, located at or near the event venue. The ticket holder can post or provide information regarding the ticket or tickets which he or she desires to sell or resell for the remaining portion of the event or game, the price which he or she is willing to sell or resell the ticket or tickets or the right to use the seat or seats corresponding thereto for the remaining portion of the event or game, and/or any other terms and/or conditions governing the sale or resale of the ticket or tickets for the remaining portion of the event or game.

Ticket issuers can also utilize the embodiment of FIGS. 2A and 2B in order to sell or resell a ticket or tickets. In the case of ticket issuers utilizing the apparatus 100, the ticket issuers can access the central processing computer 10 via their respective ticket issuer communication device 30.

With reference to FIGS. 2A and 2B, the operation of the apparatus 100 commences at step 200. At step 201, an user or individual desiring to purchase a ticket or tickets for an event, or a ticket or tickets for a remaining portion of an event, or a ticket option(s), can access the central processing computer 10 via any of the herein-described user communication devices.

At step 202, the user or individual can enter a request for a ticket or tickets for an event or a request for a ticket or tickets for a remaining portion of an event. In the case of a ticket option(s), the user or individual can enter a request for a ticket or tickets for an event or a request for a ticket option or ticket options for an event or for a remaining portion of an event. The request can be a general request for any ticket or tickets, and/or a request for any kind or type of ticket or tickets. The request can also be a general request for a ticket option or ticket options and/or a request for any kind or type of ticket option or ticket options.

The request can also include a request for a ticket or tickets in a particular location in the event venue. The request can also include a price which the user or individual is willing to pay for the ticket or tickets and/or any other terms or conditions which may govern the user's or the individual's purchase of the ticket or tickets or the right to use the ticket or tickets for any remaining portion of the event. At step 202, the user's or the individual's request is also transmitted to the central processing computer 10.

At step 203, the central processing computer 10 can receive and process the user's or the individual's request. At step 203, the central processing computer 10 can identify any ticket or tickets which may satisfy the user's or the individual's request and/or can identify any available ticket of tickets which may be available. In the case of a ticket option or ticket options, the central processing computer 10, at step 203, can identify any ticket option or ticket options which may satisfy the user's or the individual's request and/or can identify any available ticket option or ticket options which may be available.

At step 204, the central processing computer 10 can generate a ticket availability report or message. The ticket availability report can contain information regarding the ticket or tickets, the location of the ticket or tickets in the respective event or event venue, the price of the ticket or tickets, a video clip or image of the view from the ticket location, and/or any other terms or conditions governing the sale or resale of the ticket or tickets.

The price or prices of the respective ticket or tickets can change in any appropriate manner which the market may bear or allow, and/or which may be dictated by the ticket holder, prior to and up to the start of the event. The price or prices of the respective ticket or tickets can also change in any appropriate manner which the market may bear or allow, and/or which may be dictated by the ticket holder, during the course of the event. For example, the price of a ticket may decrease after the just before the event starts, after the event starts, and/or during the course of the event. Ticket price or pricing can be determined by the ticket issuer, the ticket holder, and/or in any other appropriate manner.

The ticket availability report can also contain information regarding the event, a status of the event in progress, and/or any other information regarding the event or venue which may be of interest to the user or individual.

In the case of a ticket option or ticket options, the central processing computer 10 can, at step 204, generate a ticket option availability report or message which can contain any of the above-described information which may be relevant to a ticket option or ticket options.

At step 205, the central processing computer 10 can transmit the ticket availability report to the user communication device 20. In the case of a ticket option or ticket options, the central processing computer 10 can, at step 205, transmit the ticket option availability report to the user communication device 20. At step 206, the user communication device 20 can receive and process the ticket availability report. In the case of a ticket option or ticket options, the user communication device 20 can receive and process the ticket option availability report, at step 206.

At step 207, the user or individual can review the information contained in the ticket availability report and enter a response containing information regarding whether or not the user or individual desires to purchase a ticket or tickets which are identified therein as being for sale or resale. In the case of a ticket option or ticket options, the user or individual can, at step 207, review the information contained in the ticket option availability report and enter a response containing information regarding whether or not the user or individual desires to purchase a ticket option or ticket options which are identified therein as being for sale or resale.

If the user or individual desires to purchase a ticket or tickets, the user's or the individual's response can contain information regarding the ticket or tickets which he or she desires to purchase, the price he or she is willing to pay, a payment identifier, a credit card account number, a charge card account number, a debit card account number, a checking account number, a financial account number, an electronic money account number, and/or any other payment information, and/or any other information related to purchasing the ticket or tickets. In the case of a ticket option or ticket options, the user's or individual's response can contain any of the above-described information which may be relevant to the purchase of a ticket option or ticket options.

In the case of utilization in conjunction with a public kiosk-based or ATM-based user communication device 20, the user or individual can also insert money or cash into the respective user communication device 20.

At step 208, the user's or the individual's response can be transmitted to the central processing computer 10. At step 209, the central processing computer can receive and process the user's or the individual's response. At step 210, the central processing computer 10 can determine whether the user or individual desires to purchase a ticket or tickets. In the case of a ticket option or ticket options, the central processing computer 10 can, at step 210, determine whether the user or individual desires to purchase a ticket option or ticket options. If, at step 210, it is determined that the user or individual does not desire to purchase a ticket or tickets, and/or a ticket option or ticket options, then the operation of the central processing computer 10 will cease at step 211.

If, at step 210, it is determined the user or individual desires to purchase a ticket or tickets, and/or a ticket option or ticket options, then the central processing computer 10 will proceed to step 212 and process the purchase of the ticket or tickets, and/or process the purchase of the ticket option or ticket options. At step 212, the central processing computer 10 will process the payment for the purchase of the ticket or tickets, and/or process the purchase of a ticket option or ticket options.

At step 213, the central processing computer 10 can consummate the transaction by effectuating payment to the ticket holder, and/or to a ticket option holder, such as by depositing payment for the ticket or tickets into a respective financial account corresponding to the ticket holder and/or the ticket option holder. The central processing computer 10 can also effectuate any withdrawal(s) from a financial account(s) of the user or individual, if applicable. The central processing computer 10 can also effectuate payment to any third party facilitators or ticket issuers, or any other third parties who are or who may have earned a commission for facilitating the sale or for assisting in facilitating the sale. For example, a provider of the kiosk-based user communication device may earn a commission for facilitating the sale or resale.

At step 213, the central processing computer 10 can also generate a notification message for the ticket holder and/or the ticket option holder in order to notify him or her of the sale or resale of the ticket or tickets, and/or to notify him or her of the sale or resale of the ticket options ticket options.

The notification message can include information regarding the ticket or tickets sold as well as the price received for the ticket or tickets. In the case of a ticket option or ticket options, the notification message can include information regarding the ticket option or ticket options sold as well as the price received for the ticket option or ticket options. The central processing computer 10 can also, at step 213, transmit the notification message to the user communication device associated with the ticket holder and/or the ticket option holder.

The notification message can be any one or more of a beeper or pager message(s), an instant messaging message(s), a telephone call, a telephone message, an e-mail message(s), an electronic data transmission(s), and/or any other suitable communication(s).

At step 213, the central processing computer 10 can also transmit the information for or regarding the ticket or tickets, to the user communication device 20. In the case of a ticket option or ticket options, the central processing computer 10 can, at step 213, transmit the information for or regarding the ticket option or ticket options, to the user communication device 20.

In the case of a kiosk-based user communication device 20, or a computer or communication device having a printer associated therewith and/or integrated therewith, the ticket information can be printed out in hard copy form at the user communication device 20 and can be utilized as a conventional ticket. In the case of a ticket option or ticket options, the ticket option information can also be printed out in hard copy form at the user communication device 20 and can be utilized in any appropriate manner.

In the case of a computer or communication device which does not have a printer associated therewith, the ticket and/or ticket information can be displayed and/or stored for display to event or venue personnel in order to evidence the user's or the individual's purchase of the ticket or tickets. When displayed on the user's or the individual's communication device 10 the ticket information can constitute an electronic ticket for the event. In a similar manner, ticket option information can also be displayed and/or stored for display as evidence of the ticket option.

The electronic ticket information can also include a purchase confirmation code or number which can be utilized to obtain hard copy tickets at a user communication device 20 located at the event or event venue, at a ticket issuer communication device 30, and/or at a central processing computer 10. For example, an user or individual can obtain tickets via a wireless user communication device, and utilize the information associated therewith in order to obtain hard copy tickets at the stadium of a sporting event or ball game. In a similar manner, electronic ticket option information can also include a purchase confirmation code or number which can be utilized to obtain hard copy ticket options at a user communication device 20 located at the event or event venue, at a ticket issuer communication device 30, and/or at a central processing computer 10.

The preferred embodiment of FIGS. 2A and 2B can be utilized by an user or individual in order to purchase a ticket or tickets for an event at any time. The preferred embodiment of FIGS. 2A and 2B can also be utilized by an user or individual in order to upgrade his or her ticket or tickets, and/or seat or seats corresponding thereto, during an event and/or prior to the conclusion or completion of the event. For example, in the case of a ticket upgrade, a user or individual seated according to a certain ticket can upgrade his or her ticket or tickets and/or seating location during the event by purchasing an available ticket for a more desirable seating location.

In a similar manner, the preferred embodiment of FIGS. 2A and 2B can also be utilized by a user or individual in order to purchase a ticket option or ticket options for an event at any time, and/or to upgrade a ticket option or ticket options at any time.

Thereafter, the operation of the apparatus 100 and/or the central processing computer 10 will proceed to, and cease at, step 211.

In another preferred embodiment and as described above, the apparatus 100 of FIGS. 2A and 2B can be utilized in the same, a similar, and/or an analogous, manner in order to sell or resell options for tickets for any of the events or venues described herein. The ticket options can be priced in any appropriate manner by any of the herein-described ticket holders and/or ticket issuers. The ticket options can also be priced according to, and/or by utilizing, financial options pricing models. Applicant incorporates by reference herein the subject matter and teachings of *Options, Futures, and Other Derivatives*, Third Edition, John C. Hull, Prentice-Hall, 1997. Applicant also incorporates by reference herein the subject matter and teachings of *Futures, Options, & Swaps*, Second Edition, Robert W. Kolb, Blackwell, 1997. Applicant also incorporates by reference herein the subject matter and teachings of *The Handbook of Equity Derivatives*, Revised Edition, Jack Clark Francis, et al., Wiley 2000.

The apparatus 100 can also process option information which can include the term structure of the option, the option price, and/or any other information related to the option or option sale. The apparatus 100 can be utilized in the same, a similar, and/or an analogous manner, as described in the operational steps 200 through 213 in order to sell or resell options for tickets for any of the herein-described events or venues.

Figure 3:
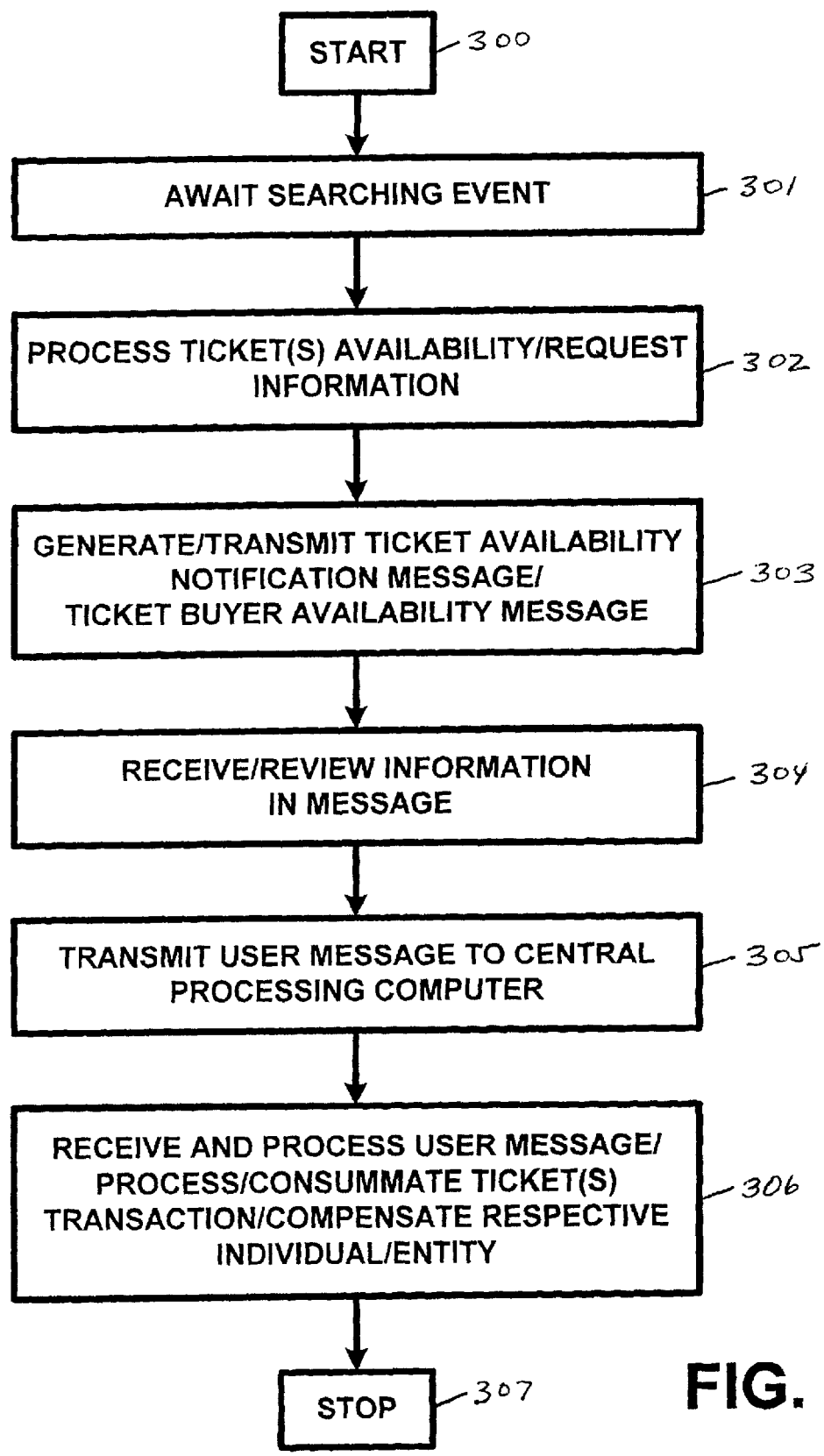
FIG. 3 illustrates another preferred embodiment method for utilizing the apparatus of FIG. 1, in flow diagram form.

In another preferred embodiment, the apparatus and method of the present invention can also be utilized in order to provide notification of the availability of a ticket or tickets for sale or resale. FIG. 3 illustrates another preferred embodiment method of utilizing the apparatus of the present invention, in flow diagram form.

In the embodiment of FIG. 3, the various users or individuals who desire to purchase a ticket or tickets to an event and/or who desire to purchase a ticket or tickets for a remaining portion of an event can post their ticket requests with the central processing computer 10 at any time. The user or individual can access the central processing computer 10 via any of the user communication devices 20 described herein and post their request for a ticket or tickets to an event or venue.

The request can include information regarding the event or venue, the ticket(s) requested, and/or the area of seating in the venue. The ticket request can also include information regarding the price or prices which the user or individual may be willing to pay for the ticket(s). The ticket request information can also include any request to purchase an option or options for any of the tickets described herein. The ticket request information can also include information regarding any date(s) and/or time(s) limitations, requirements, and/or deadlines.

The central processing computer 10 can receive, process, and/or store, the ticket request information in the database of the central processing computer 10.

The operation of the apparatus 100, as described herein with reference to FIG. 3, can be utilized to provide notification regarding the availability of a ticket or tickets for sale or resale as well as to provide notification regarding the availability of a ticket option or options for sale or resale.

With reference to FIG. 3, the operation of the apparatus 100 commences at step 300. At step 301, the central processing computer 10 will await the occurrence of a searching event. The searching event can be any event which can result in a need or desire for a ticket holder to sell or resell a ticket or tickets or a need or desire for an user or individual to purchase a ticket or tickets. In the case of ticket options, the searching event can be any event which can result in a need or desire for a ticket holder to sell or resell a ticket option or options or a need or desire for an user or individual to purchase a ticket option or options.

The searching event can also be a posting of a ticket or tickets for sale or resale and/or a posting of a request to buy a ticket or tickets. The searching event can also be defined as, and/or be programmed to be performed at, a pre-determined time(s) prior to an event, at pre-determined times during an event, upon a ticket holder leaving an event prior to completion or conclusion, and/or upon a ticket holder notifying the central processing computer 10 that he or she will no longer be utilizing a ticket or tickets. The searching event can also be any other occurrence, elapsing of a period of time, and/or a point(s) of progression through an event, which can be defined as triggering a search of the available tickets for sale or resale in conjunction with a request to purchase a ticket or tickets.

At step 302, the central processing computer 10 will process the information regarding the ticket or tickets which are available for sale or resale in conjunction with the ticket requests and/or the ticket request postings from user(s) or individual(s).

At step 303, the central processing computer 10 will generate a ticket availability notification message and transmit same to the user communication device 20 which is associated with, and/or which is being utilized by, the user or individual. The ticket availability notification message can include information regarding the available ticket or tickets, the location of the seat or seats corresponding to the ticket, the price of the ticket or tickets and/or any other information related to the ticket or tickets. The ticket availability notification message can also include a video clip or image showing a view from the respective seat or seats corresponding to the ticket or tickets. The ticket availability notification message can also include or contain any of the information described herein as being contained in the herein-described ticket availability report or message.

The ticket availability message can also contain information regarding the event, a status of the event in progress, and/or any other information regarding the event or venue which may be of interest to the user or individual.

At step 303, the central processing computer 10 can also generate a ticket buyer availability message and transmit same to the user communication device 20 associated with or being utilized by the ticket holder.

At step 304, the user or individual can receive and review the information contained in the ticket availability notification message and decide whether or not to purchase any ticket or tickets which are identified therein. If the user or individual desires to purchase a ticket or tickets, the user or individual, at step 305, can transmit an appropriate message to the central processing computer 10.

In another preferred embodiment, the user or individual can be provided with contact information for or regarding the ticket holder. In this embodiment, the user or individual can contact the ticket holder and the two parties can thereafter communicate with each other and/or enter in a transaction involving the tickets independently of the central processing computer 10.

At step 306, the central processing computer 10 can receive and process the user's or the individual's message containing the purchase order and process and/or consummate the transaction involving the purchase of the ticket or tickets. At step 306, the central processing computer 10 can consummate the transaction by effectuating payment to the ticket holder such as by depositing payment for the ticket or tickets into a respective financial account corresponding to the ticket holder. The central processing computer 10 can also effectuate any withdrawal(s) from a financial account(s) of the user or individual, if applicable. The central processing computer 10 can also effectuate payment to any third party facilitators or ticket issuers, or any other third parties who are or who may have earned a commission for facilitating the sale or for assisting in facilitating the sale.

At step 306, the central processing computer 10 can also generate a notification message for the ticket holder in order to notify him or her of the sale or resale of the ticket or tickets. The notification message can include information regarding the ticket or tickets sold as well as the price received for the ticket or tickets. The central processing computer 10 can also, at step 306, transmit the notification message to the user communication device associated with the ticket holder.

At step 306, the central processing computer 10 can also transmit the information for or regarding the ticket or tickets to the user communication device 20. In the case of a kiosk-based user communication device 20, or a computer or communication device having a printer associated therewith and/or integrated therewith, the ticket information can be printed out in hard copy form at the user communication device 20 and be utilized as a conventional ticket.

In the case of a computer or communication device which does not have a printer associated therewith, the ticket and/or ticket information can be displayed and/or stored for display to event or venue personnel in order to evidence the user's or the individual's purchase of the ticket or tickets. When displayed on the user's or the individual's communication device 10 the ticket information can constitute an electronic ticket for the event.

The electronic ticket information can also include a purchase confirmation code or number which can be utilized to obtain hard copy tickets at a user communication device 20 located at the event or event venue, at a ticket issuer communication device 30, and/or at a central processing computer 10. For example, a user or individual can obtain tickets via a wireless user communication device, and utilize the information associated therewith in order to obtain hard copy tickets at the stadium of a sporting event or ball game.

Thereafter, the operation of the apparatus 100 will cease at step 307.

Figure 4:
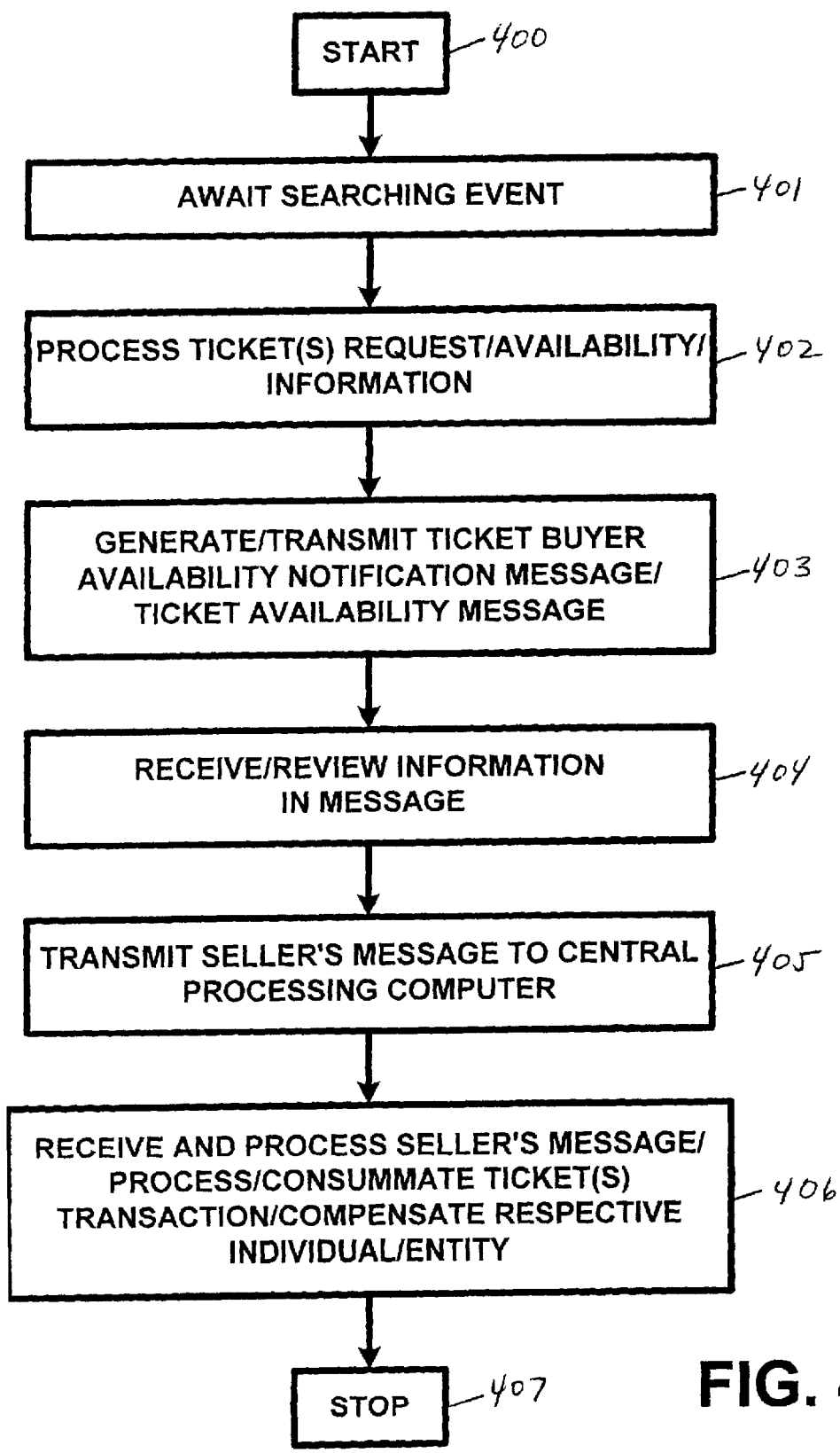
FIG. 4 illustrates another preferred embodiment method for utilizing the apparatus of FIG. 1, in flow diagram form.

In another preferred embodiment, the apparatus and method of the present invention can also be utilized in order to provide notification of the availability of a buyer for a ticket or tickets. FIG. 4 illustrates another preferred embodiment method of utilizing the apparatus of the present invention, in flow diagram form.

In the embodiment of FIG. 4, the various ticket holders can post ticket information regarding the ticket or tickets which they desire to sell or resell with the central processing computer 10 at any time. The ticket holder can access the central processing computer 10 via any of the user communication devices 20 described herein and can post the ticket or tickets to an event or venue as being for sale or resale.

The ticket information can include information regarding the event or venue, the ticket(s) for sale, and/or the area of seating in the venue. The ticket information can also include information regarding the price or prices which the ticket holder desires to receive for the ticket or tickets. The ticket information can also include an offer to sell an option or options for any of the tickets described herein. The ticket information can also include information regarding any date(s) and/or time(s) limitations, requirements, and/or deadlines, relating to the ticket(s) offering.

The central processing computer 10 can receive, process, and/or store, the ticket information in the database of the central processing computer 10.

The operation of the apparatus 100, as described herein with reference to FIG. 4, can be utilized to provide notification regarding the availability of a buyer of a ticket or tickets as well as to provide notification regarding the availability of a buyer of a ticket option or options.

With reference to FIG. 4, the operation of the apparatus 100 commences at step 400. At step 401, the central processing computer 10 will await the occurrence of a searching event. The searching event can be any event which can result in a need or desire for a user or individual to purchase a ticket or tickets or a need or desire for a ticket holder to sell or resell a ticket or tickets. In the case of ticket options, the searching event can be any event which can result in a need or desire for a user or individual to purchase a ticket option or options or a need or desire for a ticket holder to sell or resell a ticket option or options.

The searching event can also be a posting of a user's or individual's request for a ticket or tickets and/or a posting of a ticket or tickets for sale or resale by a ticket holder. The searching event can also be defined as, and/or be programmed to be performed at, a pre-determined time(s) prior to an event, at pre-determined times during an event, upon a ticket holder leaving an event prior to completion or conclusion, and/or upon a ticket holder notifying the central processing computer 10 that he or she will no longer be utilizing a ticket or tickets.

The searching event can also be any other occurrence, elapsing of a period of time, and/or a point(s) of progression through an event, which can be defined as triggering a search of ticket requests in conjunction with a ticket or tickets which are available for sale or resale.

At step 402, the central processing computer 10 will process the information regarding a request for a ticket or tickets in conjunction with information regarding the ticket or tickets which are posted and/or which are available for sale or resale.

At step 403, the central processing computer 10 will generate a ticket buyer availability notification message and transmit same to the user communication device 20 which is associated with, and/or which is being utilized by, the ticket holder. The ticket buyer availability notification message can include information regarding the available user or individual desirous of purchasing the respective ticket or tickets, the price the user or individual is willing to pay for the ticket or tickets, and/or any other information related to the ticket or tickets and/or to the purchase of same.

At step 403, the central processing computer 10 can also generate a ticket availability message and transmit same to the user communication device 20 associated with or being utilized by the user or individual interested in purchasing the ticket or tickets.

At step 404, the ticket holder can review the information contained in the ticket buyer availability notification message and decide whether or not to sell the ticket or tickets to the user or individual. If ticket holder desires to sell the ticket or tickets, the ticket holder, at step 405, can transmit an appropriate seller's message to the central processing computer 10. The seller's message can contain information regarding instructions for selling the tickets to the user or individual.

The seller's message can also contain a counter-offer such as a counter-offer offering to sell the ticket or tickets at a different price. In the case of a counter-offer being included in the seller's message, the central processing computer 10 can so notify the user or individual and any of the above-described steps can be repeated until a deal is reached between the two parties.

In another preferred embodiment, the ticket holder can be provided with contact information for or regarding the user or individual. In this embodiment, the ticket holder can contact the user or individual and the two parties can thereafter communicate with each other and/or enter in a transaction involving the tickets independently of the central processing computer 10.

At step 406, the central processing computer 10 can receive and process the seller's message containing and can consummate the transaction involving the sale or resale of the ticket or tickets. At step 406, the central processing computer 10 can process and/or consummate the transaction by effectuating payment to the ticket holder such as by depositing payment for the ticket or tickets into a respective financial account corresponding to the ticket holder. The central processing computer 10 can also effectuate any withdrawal(s) from a financial account(s) of the user of individual, if applicable. The central processing computer 10 can also effectuate payment to any third party facilitators or ticket issuers, or any other third parties who are or who may have earned a commission for facilitating the sale or for assisting in facilitating the sale.

At step 406, the central processing computer 10 can also generate a notification message for the user or individual in order to notify him or her of his or her purchase of the ticket or tickets. The notification message can include information regarding the ticket or tickets purchased as well as the price paid for the ticket or tickets. The central processing computer 10 can also, at step 406, transmit the notification message to the user communication device associated with the user or individual.

At step 406, the central processing computer 10 can also transmit the information for or regarding the ticket or tickets to the user communication device 20 of the user or individual purchasing the ticket or tickets. In the case of a kiosk-based user communication device 20, or a computer or communication device having a printer associated therewith and/or integrated therewith, the ticket information can be printed out in hard copy form at the user communication device 20 and be utilized as a conventional ticket.

In the case of a computer or communication device which does not have a printer associated therewith, the ticket and/or ticket information can be displayed and/or stored for display to event or venue personnel in order to evidence the user's or the individual's purchase of the ticket or tickets. When displayed on the user's or the individual's communication device 10 the ticket information can constitute an electronic ticket for the event.

The electronic ticket information can also include a purchase confirmation code or number which can be utilized to obtain hard copy tickets at a user communication device 20 located at the event or event venue, at a ticket issuer communication device 30, and/or at a central processing computer 10.

Thereafter, the operation of the apparatus 100 will cease at step 407.

In another preferred embodiment, a central processing computer(s) 10 can be associated with, and/or can be operated by, any of the ticket issuers as defined and/or as described herein. A central processing computer(s) 10 can also be associated with, and/or can be operated by, any of the ticket holders as defined and/or as described herein. A central processing computer(s) 10 can also be associated with, and/or can be operated by, any of the users or individuals as defined and/or as described herein.

In another preferred embodiment, any of the processing routines and/or functionality, described herein as being performed by the central processing computer 10 can also be performed in whole and/or in part by any of the herein-described user communication devices 20 and/or can also be performed in whole or in part by any of the herein-described ticket issuer communication devices 30.

In any and/or all of the embodiments described herein, any interactions, negotiations, and/or deals reached, between any of the users, individuals, entities, or parties, can be monitored and/or be recorded by the central processing computer 10 and be stored in the database of the central processing computer 10.

In any and/or all of the embodiments described herein, the central processing computer 10 can record and store data and/or information regarding any and/or all of the transactions, sales, re-sales, and/or purchases, involving any of the herein-described tickets and/or ticket options (hereinafter referred to as "transaction information"). The transaction information can be utilized for any appropriate purpose(s) such as, but not limited to, subsequent pricing of any of the herein-described tickets or ticket options, for conducting marketing studies, for conducting consumer behavior studies, for conducting advertisement efforts and/or activities, for conducting marketing efforts and/or activities, and/or for any other appropriate purpose, effort, or activity.

In any and/or all of the embodiments described herein, any of the messages, notification messages, reports, and/or transmissions, described herein, can be any one or more of a beeper or pager message(s), an instant messaging message(s), a telephone call, a telephone message, an e-mail message(s), an electronic data transmission(s), and/or any other suitable communication(s).

The apparatus 100 and/or the central processing computer 10 can administer and/or maintain a financial account(s) for, or on behalf of, any of the herein-described and/or herein-defined users, individuals, ticket holders, and/or ticket issuers, and/or other users, individuals, or entities, who or which utilize the apparatus and method of the present invention. The financial accounts may be bank accounts, electronic money accounts, credit accounts, debit account, charge accounts, and/or any other accounts for facilitating financial transactions.

The apparatus 100 and/or the central processing computer 10 can make a payment and/or a transfer for, or on behalf of, any of the herein-described and/or herein-defined users, individuals, ticket holders, and/or ticket issuers, and/or other users, individuals, or entities, and/or can receive a payment and/or a transfer for, or on behalf of, any of the herein-described and/or herein-defined users, individuals, ticket holders, and/or ticket issuers, and/or other users, individuals, or entities, whichever the case may be.

In another preferred embodiment, the apparatus and method of the present invention can be utilized to provide for the bidding for, and/or the auctioning off of, any of the herein-described tickets and/or ticket options.

The apparatus and method of the present invention can also be utilized to provide for the bidding for, and/or the auctioning off of, any of the herein-described tickets and/or ticket options. Applicant hereby incorporates by reference herein the subject matter of U.S. Provisional Patent Application Ser. No. 60/120,883 which teaches an apparatus and method for effectuating commerce in a network environment. Applicant also hereby incorporates by reference herein the subject matter of U.S. patent application Ser. No. 09/498,143 which teaches and discloses an apparatus and method for effectuating commerce in a network environment.

When utilized to perform bidding and/or auctioning activities, the respective users, individuals, ticket holders, and/or ticket issuers, and/or other users, individuals, or entities, can direct their respective bidding activity or activities and/or auctioning activity or activities to any single, group of, and/or combination of any, users, individuals, ticket holders, and/or ticket issuers, and/or other users, individuals, or entities.

The bidding and/or auctioning activities can be directed to any of the users, individuals, ticket holders, and/or ticket issuers, and/or other users, individuals, or entities, which may be specified and/or identified by or from any of the various searching routines described herein.

Any and/or all of the respective bidding activities and/or auctioning activities can be effected via e-mail messages, electronic message transmissions, electronic catalogs, electronic coupons, pager messages, facsimile messages, telephone calls or messages, physical mail delivery, and/or via any other method, means and/or mode of communication.

In another preferred embodiment, as well as in any of the embodiments described herein, intelligent agents, software agents, mobile agents, and/or related technologies, can be utilized in conjunction with the present invention. The respective intelligent agent(s), software agent(s), mobile agent(s), (hereinafter referred to collectively as "intelligent agent" or "intelligent agents") can be programmed and/or designed to act on behalf of the respective users, individuals, ticket holders, and/or ticket issuers, and/or other users, individuals, or entities, so as to act on behalf of the respective user, individual, entity, or party, as well as to perform any of processing functions and/or other functions described herein.

The intelligent agent can act on behalf of the respective user, individual, entity, or party, in various related interactions and/or other activities which are described as being performed herein and/or which may be incidental and/or related thereto. Therefore, the present invention also provides an agent-based apparatus and method for selling or reselling tickets and/or ticket options for an event or venue.

Applicant hereby incorporates by reference herein the subject matter of the *Agent Sourcebook, A Complete Guide to Desktop, Internet and Intranet Agents*, by Alper Caglayan and Colin Harrison, Wiley Computer Publishing, 1997. Applicant also incorporates by reference herein the subject matter of *Cool Intelligent Agents For The Net*, by Leslie L. Lesnick with Ralph E. Moore, IDG Books Worldwide, Inc. 1997.

The apparatus of the present invention, in any and/or all of the embodiments described herein, can also be programmed to be self-activating and/or activated automatically.

The apparatus of the present invention can also be programmed in order to automatically generate and/or transmit any of the e-mail messages, electronic message transmissions, electronic notification transmissions, electronic catalogs, electronic coupons, and/or any of the communications, which are described herein, between any of the users, individuals, entities, and/or parties, which utilize the present invention.

In any and/or all of the embodiments described herein, any electronic messages, such as e-mail messages, electronic message transmissions, pager messages, telephone calls or messages, facsimile transmissions, etc., which are generated by the central processing computer 10, and/or any of the other computer 20, and/or 30, can contain appropriate hyperlinks, and/or forwarding information, to the sending party, to another electronic message and/or e-mail, to a third party, to other information, and/or to another information source.

The present invention, in any and/or all of the herein-described embodiments, can utilize electronic commerce technologies and security methods, techniques and technologies, as described and as set forth in *Electronic Commerce Technical, Business, and Legal Issues*, Nabil R. Adam, et al. Prentice Hall, 1999 and *Web Security & Commerce*, Simson Garfinkel with Gene Spafford, O'Reilly 1997, the subject matter of which are hereby incorporated by reference herein.

The communications networks and/or systems on, or over, which the present invention may be utilized, can include any one or combination of telecommunication networks or systems, satellite communication networks or systems, radio communication networks or systems, digital communication networks or systems, digital satellite communication networks or systems, personal communications services networks or systems, cable television networks or systems, broadband communication networks or systems, low earth orbiting satellite (LEOs) networks or systems, wireless communication networks or systems, wireless Internet networks or systems, wireless World Wide Web networks or systems, as well as in, or on any internets and/or intranets, the Internet, the World Wide Web, and any other suitable communication network or system.

The data and/or information, described as being stored in the database of the central processing computer 10 and/or in any of the other databases described herein, can be continuously updated so as to store the latest values for the data and/or information and can be stored and be made available for future processing routines.

Any and/or all of the data and/or information described herein, which is stored in the database of the central processing computer 10, or in the collection of databases, can be linked via relational database techniques and/or via any appropriate database management techniques. The data and/or information, in the preferred embodiments, can be updated via inputs from any of the computers and/or communication devices 10, 20, and/or 30, and/or external computers or communication devices, described herein, in real-time, and/or via dynamically linked database management techniques. The above-described updates can also be provided from other information sources via the communication network.

While the present invention has been described and illustrated in various preferred and alternate embodiments, such descriptions are merely illustrative of the present invention and are not to be construed to be limitations thereof. In this regard, the present invention encompasses all modifications, variations and/or alternate embodiments, with the scope of the present invention being limited only by the claims which follow.

What is claimed is:

1. A computer-implemented method, comprising:

storing, with a central processing computer, information regarding a ticket request or a ticket option request for at least one of a ticket for a portion of an event which remains after a start of the event and before a completion or a conclusion of the event and a ticket option for a portion of an event which remains after a start of the event and before a completion or a conclusion of the event, wherein the ticket for a portion of the event or the ticket option for a portion of the event is derived from a ticket for an entire event, wherein the event is at least one of a game, an athletic event, a competition, a performance, a concert, and a tournament, and further wherein the event is an event which takes place at or in at least one of a stadium, an arena, a theatre, a movie theatre, a concert hall, a museum, and a performance hall, and further wherein the ticket for the entire event corresponds to a seat or seats at the at least one of a stadium, an arena, a theatre, a movie theatre, a concert hall, a museum, and a performance hall, for the event, wherein the ticket for the entire event is purchased from a ticket issuer by a first individual having a ticket account, and further wherein the ticket for a portion of the event or the ticket option for a portion of the event is purchased by or used by a second individual during the event and before the completion or the conclusion of the event with a payment for a purchase or a use of the ticket for a portion of the event, or a payment for a purchase or a use of the ticket option for a portion of the event, being made to the ticket account of the first individual or a ticket account of a third individual;

receiving and storing, with the central processing computer, information regarding an available ticket for a portion of an event which remains after a start of the event and before a completion or a conclusion of the event either prior to a start or a completion or a conclusion of the event or when the first individual or the third individual is leaving a venue of the event or leaving the event during the event and prior to a completion or a conclusion of the event, wherein the first individual or the third individual initiates or establishes a communication link with the central processing computer using a first communication device, and further wherein the information regarding an available ticket for a portion of an event is transmitted from the first communication device and is received by the central processing computer after the communication link is initiated or established;

processing, with the central processing computer, the information regarding a ticket request or a ticket option request for at least one of a ticket for a portion of an event which remains after a start of the event and before a completion or a conclusion of the event and a ticket option for a portion of an event which remains after a start of the event and before a completion or a conclusion of the event, wherein the central processing computer processes the information regarding a ticket request or a ticket option request using the information regarding an available ticket;

generating, with the central processing computer, at least one of a ticket availability message and a ticket option availability message, wherein the at least one of a ticket availability message and a ticket option availability message contains information regarding at least one of a ticket for a portion of an event which remains after a start of the event and before a completion or a conclusion of the event and a ticket option for a portion of an event which remains after a start of the event and before a completion or a conclusion of the event, wherein the at least one of a ticket availability message and a ticket option availability message is generated before a completion or a conclusion of the event; and transmitting, from the central processing computer, the at least one of a ticket availability message and a ticket option availability message to a second communication device associated with or used by the second individual or a fourth individual, wherein the at least one of a ticket availability message and a ticket option availability message is transmitted to the second communication device before a completion or a conclusion of the event.

2. The computer-implemented method of claim 1, further comprising:

receiving a response to the at least one of a ticket availability message and a ticket option availability message, wherein the response is transmitted from the second communication device; and processing a transaction regarding a purchase of the at least one of a ticket for a portion of an event which remains after a start of the event and before a completion or a conclusion of the event and a ticket option for a portion of an event which remains after a start of the event and before a completion or a conclusion of the event.

3. The computer-implemented method of claim 2, further comprising:

transmitting information regarding the at least one of a ticket for a portion of an event which remains after a start of the event and before a completion or a conclusion of the event and a ticket option for a portion of an event which remains after a start of the event and before a completion or a conclusion of the event to the second communication device; and at least one of printing via a printer the at least one of a ticket for a portion of an event which remains after a start of the event and before a completion or a conclusion of the event and a ticket option for a portion of an event which remains after a start of the event and before a completion or a conclusion of the event and displaying via a display device information regarding the at least one of a ticket for a portion of an event which remains after a start of the event and before a completion or a conclusion of the event and a ticket option for a portion of an event which remains after a start of the event and before a completion or a conclusion of the event.

4. The computer-implemented method of claim 2, further comprising:
at least one of effectuating a payment to the ticket account and effectuating a withdrawal from an account associated with the second individual or the fourth individual.

5. The computer-implemented method of claim 2, further comprising:
effectuating a payment or a commission payment to a third party.

6. The computer-implemented method of claim 1, wherein the at least one of a ticket for a portion of an event which remains after a start of the event and before a completion or a conclusion of the event and a ticket option for a portion of an event which remains after a start of the event and before a completion or a conclusion of the event is a ticket.

7. The computer-implemented method of claim 1, wherein the at least one of a ticket for a portion of an event which remains after a start of the event and before a completion or a conclusion of the event and a ticket option for a portion of an event which remains after a start of the event and before a completion or a conclusion of the event is a ticket option.

8. The computer-implemented method of claim 1, wherein the at least one of a ticket availability message and a ticket option availability message is transmitted via, on, or over, at least one of the Internet and the World Wide Web.

9. The computer-implemented method of claim 1, wherein the first communication device or the second communication device is a wireless device or a wireless telephone.

10. The computer-implemented method of claim 1, wherein the first communication device or the second communication device is a personal digital assistant.

11. The computer-implemented method of claim 1, wherein the first communication device or the second communication device is a kiosk or an automated teller machine.

12. The computer-implemented method of claim 1, further comprising:
generating a notification message containing information regarding a purchase of at least one of a ticket for a portion of an event which remains after a start of the event and before a completion or a conclusion of the event and a ticket option for a portion of an event which remains after a start of the event and before a completion or a conclusion of the event; and
transmitting the notification message to the first communication device or to a third communication device associated with a seller of the ticket or the ticket option.

13. The computer-implemented method of claim 1, wherein the second individual or the fourth individual is located at the event or at a venue of the event.

14. The computer-implemented method of claim 1, further comprising:
storing information regarding an available buyer for the ticket or the ticket option;
processing the information regarding an available buyer for the ticket or the ticket option;
generating a buyer availability message containing information that an available buyer exists for a ticket or a ticket option; and
transmitting the buyer availability message to the first communication device or to a third communication device associated with a ticket holder or a ticket seller or used by a ticket holder or a ticket seller.

15. The computer-implemented method of claim 14, wherein the buyer availability message contains information regarding a price the available buyer is willing to pay to purchase the ticket.

16. The computer-implemented method of claim 1, further comprising:
processing information regarding an auction of, or a bidding for, a ticket or a ticket option which is identified in the at least one of a ticket availability message and a ticket option availability message.

17. The computer-implemented method of claim 1, further comprising:
generating a second ticket availability message, wherein the second ticket availability message contains information regarding a ticket or a ticket option available for sale or resale prior to a start of the event or a second event;
transmitting the second ticket availability message to the communication device associated with an individual or used by an individual;
receiving an offer to purchase the ticket or the ticket option; and
processing information regarding a sale or a resale of the ticket or the ticket option.

18. The computer-implemented method of claim 1, wherein the event is at least one of a game, an athletic event, a competition, and a tournament, and further wherein the event takes place at or in a stadium or an arena, and further wherein the ticket corresponds to a seat at or in the stadium or the arena.

19. The computer-implemented method of claim 1, wherein the event is a performance or a concert, and further wherein the event takes place at or in at least one of a stadium, an arena, a theatre, a movie theatre, a concert hall, a museum, and a performance hall, and further wherein the ticket corresponds to a seat at the at least one of a stadium, an arena, a theatre, a movie theatre, a concert hall, a museum, and a performance hall.

20. The computer-implemented method of claim 1, wherein the first communication device or the second communication device is an interactive television.

21. The computer-implemented method of claim 1, wherein the at least one of a ticket availability message and a ticket option availability message contains information regarding a status of the event.

22. The computer-implemented method of claim 1, wherein the at least one of a ticket availability message and a ticket option availability message contains a video clip or an image showing a view from a seat corresponding to the at least one of the ticket and the ticket option.

23. The computer-implemented method of claim 1, wherein the at least one of a ticket availability message and a ticket option availability message is transmitted as an e-mail message.

24. The computer-implemented method of claim 1, wherein the at least one of a ticket availability message and a ticket option availability message is transmitted as an instant messaging message.

25. The computer-implemented method of claim 1, further comprising:
storing information regarding a ticket or tickets for sale or for resale for a second event;
receiving a second ticket request or a second ticket option request, wherein the second ticket request or the second ticket option request is a request for a ticket or tickets for the second event or a request for a ticket option for a ticket or tickets for the second event;

processing information regarding the second ticket request or the second ticket option request;

generating a second ticket availability message or a second ticket option availability message in response to the second ticket request or the second ticket option request, wherein the second ticket availability message contains information regarding a ticket or tickets for sale or for resale for the second event or the second ticket option availability message contains information regarding an option for a ticket or tickets for sale or for resale for the second event; and transmitting the second ticket availability message or the second ticket option availability message to the first communication device, to the second communication device, to a third communication device, or to a fourth communication device, wherein the third communication device or the fourth communication device is associated with or is used by the first individual, the second individual, the third individual, the fourth individual, or a fifth individual.

26. The computer-implemented method of claim 25, further comprising:

receiving an offer to purchase the ticket or tickets for sale or for resale for the second event or receiving an offer to purchase the option for the ticket or tickets for sale or for resale for the second event; and processing a transaction regarding a purchase of the ticket or tickets for the second event or processing a transaction regarding a purchase of the option for the ticket or tickets for the second event.

27. The computer-implemented method of claim 26, further comprising:

transmitting information regarding the ticket or tickets for the second event, or information regarding the option for the ticket or tickets for the second event, to the first communication device, to the second communication device, to the third communication device, or to the fourth communication device; and at least one of printing, via a printer, the ticket or tickets for the second event or information regarding the option for the ticket or tickets for the second event, and displaying, via a display device, information regarding the ticket or tickets for the second event or information regarding the option for the ticket or tickets for the second event.

28. The computer-implemented method of claim 1, further comprising:

storing information regarding a second ticket request or a second ticket option request, wherein the second ticket request or the second ticket option request is a request for a ticket or tickets for a second event or a request for a ticket option for a ticket or tickets for a second event;

receiving information regarding an availability of a ticket or tickets for sale or for resale for the second event;

processing information regarding the second ticket request or the second ticket option request;

generating a second ticket availability message or a second ticket option availability message in response to the second ticket request or the second ticket option request, wherein the second ticket availability message contains information regarding a ticket or tickets for sale or for resale for the second event or the second ticket option availability message contains information regarding an option for a ticket or tickets for sale or for resale for the second event; and transmitting the second ticket availability message or the second ticket option availability message to the first communication device, to the second communication device, to a third communication device, or to a fourth communication device, wherein the third communication device or the fourth communication device is associated with or is used by the first individual, the second individual, the third individual, the fourth individual, or a fifth individual.

29. The computer-implemented method of claim 28, further comprising:

receiving an offer to purchase the ticket or tickets for sale or for resale for the second event or receiving an offer to purchase the option for the ticket or tickets for sale or for resale for the second event; and processing a transaction regarding a purchase of the ticket or tickets for the second event or processing a transaction regarding a purchase of the option for the ticket or tickets for the second event.

30. The computer-implemented method of claim 29, further comprising:

transmitting information regarding the ticket or tickets for the second event, or information regarding the option for the ticket or tickets for the second event, to the first communication device, to the second communication device, to the third communication device, or to the fourth communication device; and at least one of printing, via a printer, the ticket or tickets for the second event or information regarding the option for the ticket or tickets for the second event, and displaying, via a display device, information regarding the ticket or tickets for the second event or information regarding the option for the ticket or tickets for the second event.

31. A computer-implemented method, comprising:

receiving and storing, with a central processing computer, information regarding a ticket request or a ticket option request for at least one of a ticket for a portion of an event which remains after a start of the event and before a completion or a conclusion of the event and a ticket option for a portion of an event which remains after a start of the event and before a completion or a conclusion of the event, wherein the ticket for a portion of the event or the ticket option for a portion of the event is derived from a ticket for an entire event, wherein the event is at least one of a game, an athletic event, a competition, a performance, a concert, and a tournament, and further wherein the event is an event which takes place at or in at least one of a stadium, an arena, a theatre, a movie theatre, a concert hall, a museum, and a performance hall, and further wherein the ticket for the entire event corresponds to a seat or seats at the at least one of a stadium, an arena, a theatre, a movie theatre, a concert hall, a museum, and a performance hail, for the event, wherein the ticket for the entire event is purchased from a ticket issuer by a first individual having a ticket account, and further wherein the ticket for a portion of the event or the ticket option for a portion of the event is purchased by or used by a second individual during the event and before the completion or the conclusion of the event with a payment for a purchase or a use of the ticket for a portion of the event, or a payment for a purchase or a use of the ticket option for a portion of the event, being made to the ticket account of the first individual or a ticket account of a third individual;

receiving and storing, with the central processing computer, information regarding an available ticket for a portion of an event which remains after a start of the event and before a completion or a conclusion of the event when the first individual or the third individual is leaving a venue of the event or leaving the event during the event and prior to a completion or a conclusion of the event, wherein the first individual or the third individual initiates or establishes a communication link with the central processing computer using a first communication device, and further wherein the information regarding an available ticket for a portion of an event is transmitted from a first communication device and is received by the central processing computer after the communication link is initiated or established;

processing, with the central processing computer, the information regarding a ticket request or a ticket option request for at least one of a ticket for a portion of an event which remains after a start of the event and before a completion or a conclusion of the event and a ticket option for a portion of an event which remains after a start of the event and before a completion or a conclusion of the event, wherein the central processing computer processes the information regarding a ticket request or a ticket option request using the information regarding an available ticket;

generating, with the central processing computer, at least one of a ticket availability message and a ticket option availability message, wherein the at least one of a ticket availability message and a ticket option availability message contains information regarding at least one of a ticket for a portion of an event which remains after a start of the event and before a completion or a conclusion of the event and a ticket option for a portion of an event which remains after a start of the event and before a completion or a conclusion of the event, wherein the at least one of a ticket availability message and a ticket option availability message is generated before a completion or a conclusion of the event; and transmitting, from the central processing computer, the at least one of a ticket availability message and a ticket option availability message to a second communication device associated with or used by the second individual or a fourth individual, wherein the at least one of a ticket availability message and a ticket option availability message is transmitted to the second communication device before a completion or a conclusion of the event.

32. The computer-implemented method of claim 31, further comprising:

receiving a response to the at least one of a ticket availability message and a ticket option availability message, wherein the response is transmitted from the second communication device;

processing a transaction regarding a purchase of the at least one of a ticket for a portion of an event which remains after a start of the event and before a completion or a conclusion of the event and a ticket option for a portion of an event which remains after a start of the event and before a completion or a conclusion of the event;

transmitting information regarding the at least one of a ticket for a portion of an event which remains after a start of the event and before a completion or a conclusion of the event and a ticket option for a portion of an event which remains after a start of the event and before a completion or a conclusion of the event to the second communication device; and at least one of printing via a printer the at least one of a ticket for a portion of an event which remains after a start of the event and before a completion or a conclusion of the event and a ticket option for a portion of an event which remains after a start of the event and before a completion or a conclusion of the event and displaying via a display device information regarding the at least one of a ticket for a portion of an event which remains after a start of the event and before a completion or a conclusion of the event and a ticket option for a portion of an event which remains after a start of the event and before a completion or a conclusion of the event.

33. A computer-implemented method, comprising:

storing, with a central processing computer, information regarding a ticket request for a ticket for a portion of an event which remains after a start of the event and before a completion or a conclusion of the event, wherein the ticket for a portion of the event is derived from a ticket for an entire event, wherein the event is at least one of a game, an athletic event, a competition, a performance, a concert, and a tournament, and further wherein the event is an event which takes place at or in at least one of a stadium, an arena, a theatre, a movie theatre, a concert hall, a museum, and a performance hall, and further wherein the ticket for the entire event corresponds to a seat or seats at the at least one of a stadium, an arena, a theatre, a movie theatre, a concert hall, a museum, and a performance hall, for the event, wherein the ticket for the entire event is purchased from a ticket issuer by a first individual having a ticket account, and further wherein the ticket for a portion of the event is purchased by or used by a second individual during the event and before the completion or the conclusion of the event with a payment for a purchase or a use of the ticket for a portion of the event being made to the ticket account of the first individual or a ticket account of a third individual;

receiving and storing, with the central processing computer, information regarding an available ticket for a portion of an event which remains after a start of the event and before a completion or a conclusion of the event either prior to a start or a completion or a conclusion of the event or when the first individual or the third individual is leaving a venue of the event or leaving the event during the event and prior to a completion or a conclusion of the event, wherein the first individual or the third individual initiates or establishes a communication link with the central processing computer using a first communication device, and further wherein the information regarding an available ticket for a portion of an event is transmitted from the first communication device and is received by the central processing computer after the communication link is initiated or established;

processing, with the central processing computer, the information regarding a ticket request for a ticket for a portion of an event which remains after a start of the event and before a completion or a conclusion of the event, wherein the central processing computer processes the information regarding the ticket request using the information regarding an available ticket;

generating, with the central processing computer, a ticket availability message, wherein the ticket availability message contains information regarding a ticket for a portion of an event which remains after a start of the event and before a completion or a conclusion of the event, wherein the ticket availability message is generated before a completion or a conclusion of the event; and transmitting, from the central processing computer, the ticket availability message to a second communication device associated with or used by the second individual or a fourth individual, wherein the ticket availability message is transmitted to the second communication device before a completion or a conclusion of the event.

34. The computer-implemented method of claim 33, further comprising:
- receiving a response to the ticket availability message, wherein the response is transmitted from the second communication device;
- processing a transaction regarding a purchase of the ticket for a portion of an event which remains after a start of the event and before a completion or a conclusion of the event;
- transmitting information regarding the ticket for a portion of an event which remains after a start of the event and before a completion or a conclusion of the event to the second communication device; and
- at least one of printing, via a printer, the ticket for a portion of an event which remains after a start of the event and before a completion or a conclusion of the event and displaying, via a display device, information regarding the ticket for a portion of an event which remains after a start of the event and before a completion or a conclusion of the event.

35. The computer-implemented method of claim 34, further comprising:
- at least one of effectuating a payment to the ticket account and effectuating a withdrawal from an account associated with the second individual or the fourth individual.

36. The computer-implemented method of claim 33, further comprising:
- storing information regarding a ticket or tickets for sale or for resale for a second event;
- receiving a second ticket request, wherein the second ticket request is a request for a ticket or tickets for the second event;
- processing information regarding the second ticket request;
- generating a second ticket availability message in response to the second ticket request, wherein the second ticket availability message contains information regarding a ticket or tickets for sale or for resale for the second event; and
- transmitting the second ticket availability message to the first communication device, to the second communication device, to a third communication device, or to a fourth communication device, wherein the third communication device or the fourth communication device is associated with or is used by the first individual, the second individual, the third individual, the fourth individual, or a fifth individual.

37. The computer-implemented method of claim 36, further comprising:
- receiving an offer to purchase the ticket or tickets for sale or for resale for the second event; and
- processing a transaction regarding a purchase of the ticket or tickets for the second event.

38. The computer-implemented method of claim 37, further comprising:
- transmitting information regarding the ticket or tickets for the second event to the first communication device, to the second communication device, to the third communication device, or to the fourth communication device; and
- at least one of printing, via a printer, the ticket or tickets for the second event and displaying, via a display device, information regarding the ticket or tickets for the second event.

39. An apparatus, comprising:
a central processing computer, further comprising:
- a memory device, wherein the memory device stores information regarding a ticket request or a ticket option request for a ticket for a portion of an event which remains after a start of the event and before a completion or a conclusion of the event or a ticket option for a portion of an event which remains after a start of the event and before a completion or a conclusion of the event, wherein the ticket for a portion of the event or the ticket option for a portion of the event is derived from a ticket for an entire event, wherein the event is a game, an athletic event, a competition, a performance, a concert, or a tournament, and further wherein the event is an event which takes place at or in a stadium, an arena, a theatre, a movie theatre, a concert hall, a museum, or a performance hall, and further wherein the ticket for the entire event corresponds to a seat or seats at the stadium, the arena, the theatre, the movie theatre, the concert hall, the museum, or the performance hall, for the event, wherein the ticket for the entire event is purchased from a ticket issuer by a first individual having a ticket account, and further wherein the ticket for a portion of the event or the ticket option for a portion of the event is purchased by or used by a second individual during the event and before the completion or the conclusion of the event with a payment for a purchase or a use of the ticket for a portion of the event, or a payment for a purchase or a use of the ticket option for a portion of the event, being made to the ticket account of the first individual or a ticket account of a third individual;
- a receiver, wherein the receiver receives, and the memory device or the central processing computer stores, information regarding an available ticket for a portion of an event which remains after a start of the event and before a completion or a conclusion of the event either prior to a start or a completion or a conclusion of the event or when the first individual or the third individual is leaving a venue of the event or leaving the event during the event and prior to a completion or a conclusion of the event, wherein a communication link is initiated or established between the receiver or the central processing computer and a first communication device associated with the first individual or the third individual, and further wherein the information regarding an available ticket for a portion of an event is transmitted from the first communication device and is received by the receiver or by the central processing computer after the communication link is initiated or established;
- a processing device, wherein the processing device processes the information regarding a ticket request or a ticket option request for the ticket for a portion of an event which remains after a start of the event and before a completion or a conclusion of the event or the ticket option for a portion of an event which remains after a start of the event and before a completion or a conclusion of the event, wherein the processing device or the central processing computer processes the information regarding a ticket request or a ticket option request using the information regarding an available ticket, and further wherein the processing device or the central processing computer generates a ticket availability message or a ticket option availability message, wherein the ticket availability message or the ticket option availability message contains information regarding a ticket for a portion of an event which remains after a start of the event and before a completion or a conclusion of the event or a ticket option for a portion of an event which remains after a start of the event and before a completion or a conclusion of the event, wherein the ticket availability message or the ticket option availability message is generated before a completion or a conclusion of the event; and a transmitter, wherein the transmitter transmits the ticket availability message or the ticket option availability message to a second communication device associated with the second individual or a fourth individual, wherein the ticket availability message or the ticket option availability message is transmitted to the second communication device before a completion or a conclusion of the event.

* * * * *